Oct. 10, 1967   J. E. GUSTKEY   3,345,888

CUTTING TOOL

Filed July 21, 1965

INVENTOR.
John E. Gustkey
BY
Carness Dickey Pierce
ATTORNEYS.

United States Patent Office 3,345,888
Patented Oct. 10, 1967

3,345,888
CUTTING TOOL
John E. Gustkey, Detroit, Mich., assignor to Cogsdill
Tool Products, Inc.
Filed July 21, 1965, Ser. No. 473,641
6 Claims. (Cl. 77—58)

This invention relates to boring bars and more particularly to a cartridge containing a cutting bit which is supported in a boring bar head.

More specifically the invention pertains to a cartridge which is removably supported and adjustable in an aperture in the head of the boring bar. The cartridge is made from a cylindrical element having a square aperture for receiving a square section of the tool bit. A cutting nib extends from a cylindrical portion of the square section, the four corners of which forms a stop when abutting a washer brazed or otherwise secured to the forward end of the cylindrical element. The opposite end of the element contains a threaded section in which a screw is adjustably mounted for tensioning a spring which abuts the rear end of the tool bit. The nib has cutting edges extending at an angle of substantially 90° to each other with a rounded end portion therebetween which are relieved rearwardly in the conventional manner. The cylindrical element has a flat on one side which mates with a flat within a cylindrical aperture in the boring bar head in which a set screw is provided which engages the flat of the cylindrical element to secure the cartridge in fixed adjusted relation within the head. When properly adjusted, the cutting edges of the nib of the tool bit extends beyond the diameter of the boring bar head and is urged outwardly with a predetermined force by the spring. This force may be changed by adjusting the screw inward and outwardly within the threaded rear end of the cartridge. With this arrangement, proper cutting will be produced by the edges of the tool and damage will be prevented if the cutting edges become overloaded since the tool bit can retract within the cartridge to reduce the load thereon.

Accordingly, the main objects of the invention are: to provide a cartridge containing a spring pressed tool bit which is adjustable within an aperture in a boring bar head; to provide a cartridge made from a cylindrical body having a square aperture in which the square portion of a tool bit is longitudinally movable when urged forwardly by a spring abutting a screw which is adjustable within the body and which is limited in forward movement by a cylindrical washer through which a cylindrical end of the tool bit extends and against which the four corners of the square portion abuts; to provide a cartridge having a cylindrical body with a flat on one side which is engaged by a setscrew projecting into an aperture in a boring bar head to locate the cutting edges of a spring pressed tool bit in cutting position beyond the head, and in general, to provide a cartridge with a spring pressed tool bit which is simple in construction, economical of manufacture and adjustable within an aperture in a boring bar head.

Other objects and features of novelty of the invention will be specifically pointed out or will become apparent when referring, for a better understanding of the invention, to the following description taken in conjunction with the accompanying drawing, wherein:

FIG. 3 is an enlarged broken sectional view of the structure illustrated in FIG. 1, taken on the line 3—3 thereof;

Figure 1:
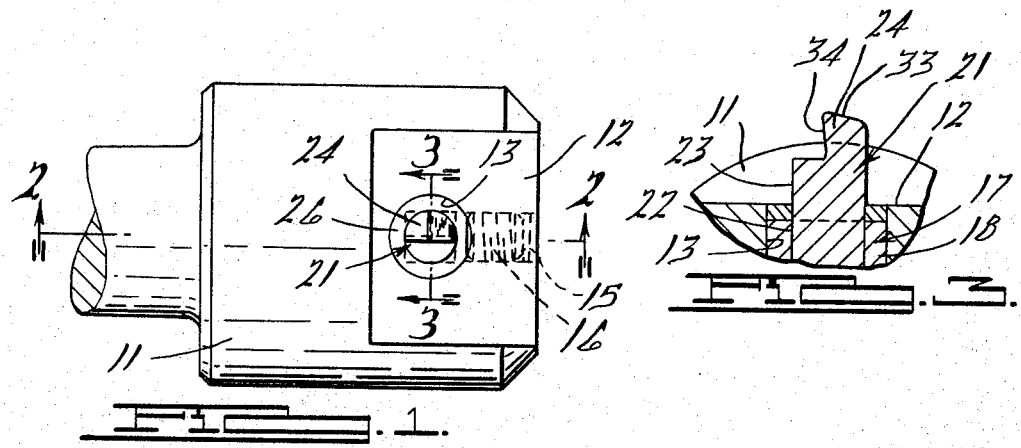
FIGURE 1 is a broken plan view of a boring bar having a cartridge containing a tool bit embodying features of the present invention.
Figure 2:
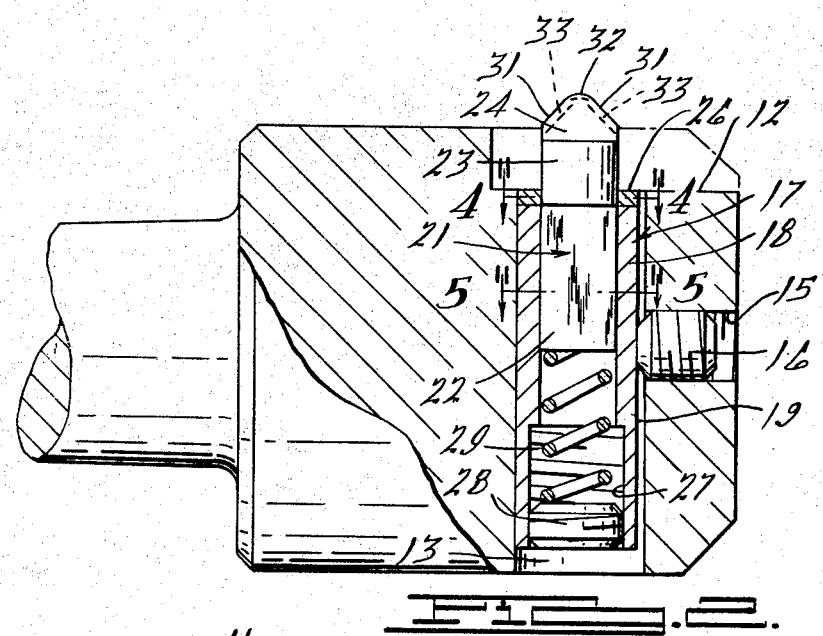
FIG. 2 is an enlarged broken sectional view of the structure illustrated in FIG. 1, taken on the line 2—2 thereof.
Figures 4, 5:
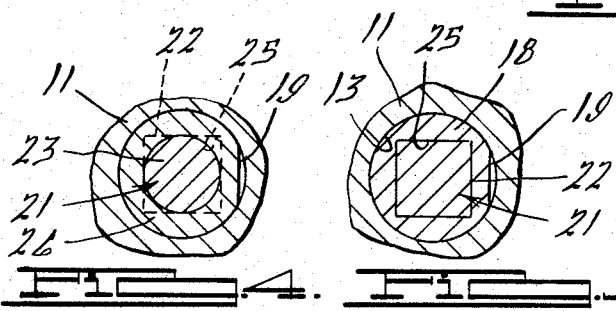
FIG. 4 is a broken sectional view of the structure illustrated in FIG. 2, taken on the line 4—4 thereof.
FIG. 5 is a broken sectional view of the structure illustrated in FIG. 2, taken on the line 5—5 thereof.

A boring bar has a head 11 provided with a flat section 12 and a through cylindrical aperture 13. A threaded aperture 15 is provided normal to the aperture 13 containing a set screw 16.

A cartridge 17 has a cylindrical body 18 containing a flat face 19 on one side. The outer surface of the body 18 mates with the cylindrical aperture 13 and the flat face 19 is engaged by the set screw 16. The flat face prevents the body 18 from turning and retains it accurately located within the boring bar aperture for axial adjustment therein.

A tool bit 21 has a square section 22 and a cylindrical portion 23 with a cutting nib 24 on the forward end thereof. The body 18 has a square aperture 25 which receives the square section 22 of the tool bit. The corners of the square section abut a cylindrical washer 26 which is brazed or otherwise secured to the forward end of the body 18 through which the cylindrical portion 23 of the tool bit 21 extends. At the rearward end of the body 18 a threaded cylindrical aperture 27 is provided in which a screw 28 is threaded for adjustment therein. The screw 28 regulates the tension on a spring 29 which abuts the rear end of the cutting tool 21 for urging it forwardly with a predetermined pressure.

The nib 24 is provided with angular cutting edges 31 which are located at substantially 90° to each other joined by an arcuate cutting edge 32. The cutting edges 31 and 32 are relieved rearwardly by sloping side 33 and a positive rake angle is provided by the sloping face 34. The cutting edges 31 and 32 are urged against the surface of the hole to be bored with a predetermined pressure and the depth of cut can be regulated by the tension on the spring 29. The spring permits the cutting tool to retract and take a smaller cut depending upon the hardness of the metal in different portions of the bore wall.

The cartridge is locked in axially adjusted position within the aperture 13 by the set screw 19, and upon releasing the screw the cartridge may be removed from the aperture 13. Upon removal of the screw 28 and spring 29, the tool bit 21 may be removed from the body 18. The cutting edges 31 and 32 may be sharpened and the tool bit replaced within the body or a new tool bit may be substituted therefor. The spring 29 and the screw 28 are adjusted within the body 18 which may then be inserted within the aperture 13 and locked in a desired position by the screw 16.

What is claimed is:

1. In a cutting tool assembly, a cartridge having a body containing a square aperture and a forward cylindrical aperture in continuation thereof, a tool bit having a body containing a square section and a forward cylindrical portion supporting a cutting nib, the inner end of the cylindrical portion of the body engaging the corners of the ends of the square section for limiting the movement of the tool bit out of the cartridge body, a threaded aperture in the rear portion of the cartridge body, a spring in said aperture engaging the end of the tool bit, and a screw in said aperture for tensioning the spring to regulate the force on the cutting nib.

2. In a cutting tool assembly, a cartridge having a body containing a square aperture and a forward cylindrical aperture in continuation thereof, a tool bit having a body containing a square section and a forward cylindrical portion supporting a cutting nib, the inner end of the cylindrical portion of the body engaging the corners of the ends of the square section for limiting the movement of the tool bit out of the cartridge body, a threaded aperture in the rear portion of the cartridge body, a spring in said aperture engaging the end of the tool bit, and a screw in said aperture for tensioning the spring to regulate the force on the cutting nib, said cylindrical portion of the tool bit body having a flat side thereon.

3. In a cutting tool assembly, a cartridge having a body containing a square aperture, a tool bit having a body containing a square section, and a forward cylindrical portion supporting a cutting nib, a washer secured at the forward end of the cartridge body through which the cylindrical portion of the tool bit extends, the rear end of cartridge body having a thread, a screw in said thread, and a spring between said screw and the tool bit for urging the latter forwardly to have the square section engage said washer.

4. In a cutting tool assembly, a cartridge having a body containing a square aperture, a tool bit having a body containing a square section, and a forward cylindrical portion supporting a cutting nib, a washer secured at the forward end of the cartridge body through which the cylindrical portion of the tool bit extends, the rear end of cartridge body having a thread, a screw in said thread, and a spring between said screw and the tool bit for urging the latter forwardly to have the square section engage said washer, said cartridge body being of cylindrical shape and having a flat face along one side.

5. In a cutting tool assembly, a cartridge having a cylindrical hollow body with a flat face along one side and a square aperture which terminates into a cylindrical aperture at the forward end, and a threaded aperture at the rearward end, a tool bit having a square body section matable with the square aperture within the cartridge body and a forward cylindrical portion which projects through the cylindrical portion of the aperture and limited in its outward movement by the engagement of the corners of the square body with the adjacent end wall of the cylindrical aperture, said cylindrical portion of the tool bit having a cutting nib extending therefrom, a spring within the body engages the rear end of the tool bit, and a screw in the threaded aperture abutting the rear end of the spring for adjusting the tension thereof and the back up force on said tool bit.

6. In a cutting tool assembly, a cartridge having a cylindrical hollow body with a flat face along one side and a square aperture which terminates into a cylindrical aperture at the forward end, and a threaded aperture at the rearward end, a tool bit having a square body section matable with the square aperture within the cartridge body and a forward cylindrical portion which projects through the cylindrical portion of the aperture and limited in its outward movement by the engagement of the corners of the square body with the adjacent end wall of the cylindrical aperture, said cylindrical portion of the tool bit having a cutting nib extending therefrom, a spring within the body engages the rear end of the tool bit, and a screw in the threaded aperture abutting the rear end of the spring for adjusting the tension thereof and the back up force on said tool bit, a boring bar having a cylindrical aperture with a flat face which receives the cylindrical body and flat face on the cartridge which is adjustable therein, and a screw in a threaded aperture in the boring bar extending inwardly from the end thereof for engaging the flat face of the cylindrical body of the cartridge for securing it in adjusted position.

References Cited
UNITED STATES PATENTS

| | | | |
|---|---|---|---|
| 2,096,489 | 10/1937 | Hassig. | |
| 2,359,210 | 9/1944 | Engel. | |
| 2,524,374 | 10/1950 | Briney | 29—96 X |

FOREIGN PATENTS

| | | |
|---|---|---|
| 36,109 | 1/1930 | France. |

WILLIAM W. DYER, Jr., *Primary Examiner.*

GERALD A. DOST, *Examiner.*